United States Patent
Black et al.

(10) Patent No.: US 7,330,920 B2
(45) Date of Patent: Feb. 12, 2008

(54) SIGNAL INITIATOR AND METHOD FOR ON-DEMAND COMMUNICATION

(75) Inventors: Greg R. Black, Vernon Hills, IL (US); Robert M. Johnson, Lake Zurich, IL (US); Stephen L. Spear, Skokie, IL (US); Charles P. Binzel, Bristol, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/171,074

(22) Filed: Jun. 30, 2005

(65) Prior Publication Data

US 2007/0005854 A1   Jan. 4, 2007

(51) Int. Cl.
*G06F 13/00*   (2006.01)
*H04N 7/173*   (2006.01)
*H04N 5/445*   (2006.01)
*H04N 7/16*   (2006.01)
*H04L 12/00*   (2006.01)
*H04L 12/66*   (2006.01)

(52) U.S. Cl. .......... 710/105; 709/232; 370/357; 710/40; 379/100.12; 725/87

(58) Field of Classification Search ........ 710/105, 710/100, 240, 40, 2, 42, 62, 73; 709/227, 709/218, 249, 250, 217, 223, 229–232, 203, 709/220; 379/100.12; 455/73, 403; 370/400, 370/260, 351, 912, 464, 257, 276, 357; 340/825; 707/10; 719/318; 725/87
See application file for complete search history.

(56) References Cited

U.S. PATENT DOCUMENTS

| 5,745,553 | A | * | 4/1998 | Mirville et al. ........ 379/201.05 |
| 5,944,795 | A | * | 8/1999 | Civanlar ................ 709/227 |
| 5,958,013 | A | * | 9/1999 | King et al. ............. 709/227 |
| 6,233,228 | B1 | * | 5/2001 | Collar et al. ........... 370/315 |
| 6,324,587 | B1 | * | 11/2001 | Trenbeath et al. ....... 719/310 |
| 6,360,186 | B1 | * | 3/2002 | Durbin ................. 702/188 |
| 6,785,724 | B1 | * | 8/2004 | Drainville et al. ....... 709/227 |
| 7,136,663 | B2 | * | 11/2006 | Metais et al. ........... 455/509 |
| 7,151,438 | B1 | * | 12/2006 | Hall et al. ............ 340/286.06 |
| 7,151,946 | B2 | * | 12/2006 | Maggenti et al. ........ 455/517 |
| 7,155,203 | B2 | * | 12/2006 | Brewer et al. .......... 455/405 |
| 7,155,248 | B2 | * | 12/2006 | Idnani ................. 455/519 |
| 7,170,863 | B1 | * | 1/2007 | Denman et al. ......... 370/260 |
| 7,190,981 | B2 | * | 3/2007 | Cherian ............... 455/574 |
| 7,197,463 | B2 | * | 3/2007 | Kotzin ................ 704/275 |
| 7,245,940 | B2 | * | 7/2007 | Serbin et al. .......... 455/563 |
| 2002/0172332 | A1 | * | 11/2002 | Carroll et al. .......... 379/67.1 |
| 2005/0049000 | A1 |  | 3/2005 | Sheynman et al. |
| 2006/0084476 | A1 | * | 4/2006 | Serbin et al. .......... 455/563 |
| 2007/0021138 | A1 | * | 1/2007 | Allen et al. ........... 455/518 |
| 2007/0054686 | A1 | * | 3/2007 | Allen et al. ........... 455/518 |

OTHER PUBLICATIONS

"Location aware resource management in smart homes" by Roy et al. (abstract only)☐☐Publication Date: Mar. 23-26, 2003.*

* cited by examiner

Primary Examiner—Gopal C. Ray
(74) Attorney, Agent, or Firm—Lawrence J. Chapa (57) ABSTRACT

A method is provided for on-demand communications in a communication network with support for a plurality of communication units participating in a common communication, which includes multiple signal initiators, each supplying a signal, which are virtually simultaneously conveyed as part of the common communication. At least one example of an on-demand communication includes push to talk. Additionally, a signal initiator is provided, which is adapted to support on-demand communications in a multi-signal initiator environment.

24 Claims, 6 Drawing Sheets

SIGNAL INITIATOR AND METHOD FOR ON-DEMAND COMMUNICATION

FIELD OF THE INVENTION

The present invention relates generally to on-demand communications, and more particularly, to an on-demand communication, which includes multiple signal initiators, each supplying a signal, which are virtually simultaneously conveyed as part of a common communication.

BACKGROUND OF THE INVENTION

On-demand communication, such as push to talk, is more traditionally a method of communication using one-way or half-duplex communication connections. This is often the case even where the communication connection, which supports the communication is capable of providing two-way or full duplex support. In many instances, on-demand communications is closely related and/or includes walkie talkie type communication, where a signal initiator will begin a one-way uplink communication by actuating a user actuatable talk button, during which time a device will capture an audio signal received by a microphone and communicate the audio signal, to be somewhat instantly received by one or more remote devices (i.e. without requiring the user of the receiving device to affirmatively establish the communication channel by answering an incoming call).

Traditionally, while a user has actuated the user actuatable talk button, the device, which has the actuated talk button, has the floor and is precluded from receiving a communication. The one or more devices which are receiving the communication are precluded from initiating a signal for transmission within the context of the already established on-demand communication for as long as the original signal initiator continues to signal an intent to communicate, for example by continuing to hold the user actuated talk button.

In at least some instances including at least some push to talk implementations in a cellular radio environment, a subsequent signal initiator can only act as a source of an audio signal after the original signal initiator has released the talk button, and the initial communication connection has been terminated and/or a new connection has been established. This generally results in a new communication connection, being freshly established whenever a new signal initiator is attempting to act as a source of a signal to be communicated to the one or more other devices.

However, there may be instances, where it is desirable for a second signal initiator to be able to respond to the first signal initiator or another member in the established group before the first signal initiator has released the talk button. Furthermore it may be desirable from a network efficiency and/or delay standpoint to enable a second signal initiator to initiate a responding communication without tearing down the initial communication connection and/or reestablishing a subsequent connection. Still further, it may be desirable to allow a second signal initiator to talk over a first signal initiator.

As a result, the present inventors have recognized that it would be beneficial to develop an on-demand communication, which includes multiple signal initiators, each capable of supplying a signal, which are virtually simultaneously conveyed as part of a common communication.

SUMMARY OF THE INVENTION

The present invention provides a method for on-demand communications in a communication network with support for a plurality of communication units participating in a common communication, which includes multiple signal initiators, each supplying a signal, which are virtually simultaneously conveyed as part of the common communication. The method includes initiating an on-demand communication by a first signal initiator for conveyance of a first signal to one or more communication units forming a communication group. The first signal intended for the one or more communication units forming a communication group is then conveyed from the first signal initiator via a first uplink channel. The first signal from the first signal initiator is then received at the one or more communication units forming the communication group via respective downlink channels.

An on-demand communication is then initiated by a second signal initiator from the one or more communication units forming the communication group for conveyance of a second signal to the other communication units of the one or more communication units forming the communication group and the first signal initiator, while the on-demand communication initiated by the first signal initiator continues. The second signal intended for the other communication units of the one or more communication units forming a communication group and the first signal initiator is then conveyed from the second signal initiator via a second uplink channel. The first signal is then combined with the second signal forming a combined signal. The combined signal is then received at any of the one or more communication units forming the communication group, which are not acting as signal initiators, via the respective downlink channels in place of the first signal from the first initiator. A signal including at least the second signal from the second signal initiator is then received at the first signal initiator via a downlink channel.

In at least one embodiment, the on-demand communication includes a push to talk communication.

In a still further embodiment, each of the signal initiators receives a signal, which includes a combination of at least the signals produced by the other signal initiators.

The present invention further provides a signal initiator, which is adapted for supporting on-demand communications in a communication network with support for a plurality of communication units participating in a common communication, which includes multiple signal initiators. Each signal initiator supplies a signal, which is virtually simultaneously conveyed as part of the common communication. The signal initiator includes a user actuatable element for initiating an on-demand communication. The signal initiator further includes a transceiver for sending and receiving a communication signal including one or more signals from one or more signal initiators, and a controller, which is adapted for conveying a signal intended for one or more communication units forming a communication group, when the user actuatable element associated with on-demand communication is initiated, and which is further adapted for receiving a signal including at least the combination of any signals conveyed by other signal initiators in the group.

In at least one embodiment, the signal initiator further includes a signal combiner for selectively producing a corresponding combined signal for each communication unit in the group, which selectively combines the signals produced by the signal initiators in the group.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

While, for example, the present desclosure describes push to talk sessions among predefined groups of mobile subscriber terminals, it is within the scope of the present invention to include non-voice communications, and more generally to describe push to transmit sessions. Examples of non-voice communications include non-voice audio, text, still and video image, and haptic communications, and combinations thereof.

Figure 1:
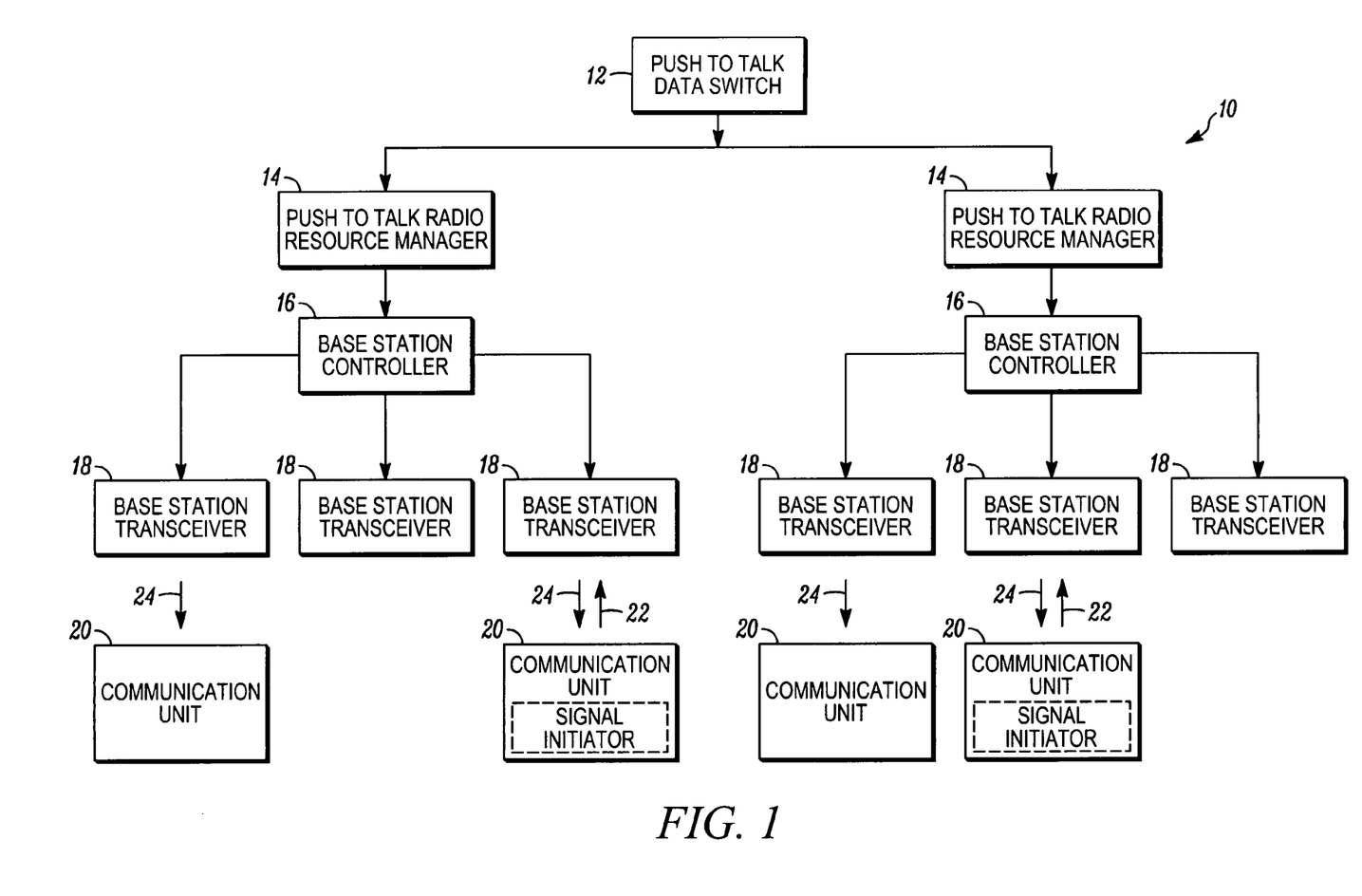
FIG. 1 is a block diagram of an exemplary communication network, which supports an on-demand communication, in accordance with at least one embodiment of the present invention.

FIG. 1 illustrates a block diagram of an exemplary network, which supports on-demand communications, in accordance with at least one embodiment of the present invention. More specifically, the exemplary network corresponds to an exemplary push to talk network 10. The push to talk network 10 includes a push to talk data switch 12, which facilitates the routing of communication signals between communication units within the network. In at least some instances, the push to talk data switch 12 will maintain and/or interface with a location registry in order that the signals can be properly routed to the current location of the communication units which are the destination of a signal being routed.

The exemplary push to talk network 10, illustrated in FIG. 1, further shows a pair of push to talk radio resource managers 14, which are each coupled to the push to talk data switch 12. The push to talk radio resource managers 14 are each adapted to establish any necessary communication connections with each of the communication units, which are participating in an on-demand communication. In at least some embodiments, the push to talk resource manager 14 will establish communication links using a packet data communication connection. In other embodiments, communication links may be established using a circuit switched communication connection.

The push to talk radio resource manager 14 is further coupled to one or more base station controllers 16, which in turn are each coupled to one or more base station transceivers 18. Each base station transceiver 18, generally corresponds to an associated geographic area, which are often referred to as a cell. Each base station transceiver 18 is largely responsible for communicating with the communication units 20 located within an associated geographic area. By routing signals through the various branches of the network 10, communication signals can be routed between the communication units 20, including communication units located in different geographical areas.

In a push to talk environment, a communication is generally initiated between users by actuating a key on the communication unit wishing to initiate communications. For purposes of at least the present application, a communication unit which initiates an on-demand communication is identified as a signal initiator. In at least some push to talk environments a communication can be established between a relatively large number of participants. Once the corresponding push to talk key is actuated in a particular signal initiator, an uplink channel 22 is established over which a communication signal can be forwarded to the network. Correspondingly, a downlink channel 24 is established between each of the communication units intended to receive the communication signal.

In some instances, the network may establish a communication link limited to a single direction of communication. Some packet data channels are limited to a single direction of communication. In other instances, the network connection may be supported by establishing a circuit switched connection, which while generally capable of supporting two-way communication, may only be partially utilized thereby using a portion of the communication channel, which is then limited to supporting the conveyance of information in a single direction.

In accordance with at least some aspects of the present invention, more than one signal initiator can communicate a signal to be conveyed to the group, using at least some of the same network resources. Furthermore the signals from multiple signal initiators can be communicated virtually simultaneously as part of a common communication, such as a push to talk session.

Virtually simultaneous communication or conveyance of signals generally relates to an on-demand communication having a beginning and an end, which frames a continuing on-demand communication initiated by a single signal initiator, which as noted above may relate to the duration of the activation of the user actuatable element for a particular signal initiator, where the duration of the on-demand communication for more than one signal initiator, each have at least a portion that are both active and/or overlap during the same time period.

In order to support multiple signal initiators as part of a common communication, when a second signal initiator begins an on-demand communication, an uplink channel 22 is activated or established between the second signal initiator and the network, and a downlink channel 24 is activated or established between the first signal initiator and the network. The newly activated or established uplink channel 22 associated with the second signal initiator enables the network to receive the signal to be communicated by the second signal initiator. The newly activated or established downlink channel 24 associated with the first signal initiator enables the network to forward communication signals from the additional signal initiators.

In some embodiments, it may be desirable to add a second unidirectional communication link to complement an already established unidirectional communication link. In other embodiments, which make use of a circuit switched communication channel, which is capable of supporting communications in both a download and an upload direction, it may not be necessary to create an additional corresponding upload or download link, but alternatively to make use of already existing capabilities of the already established communication link. In still further embodiments, it may be desirable to switch between a packet switched mode of operation including a packet switched communication connection and a circuit switched mode of operation including a circuit switched communication connection.

Generally the communication units, which are not signal initiators, will receive a combined signal which includes the communication components which originated from all signal initiators. Each of the signal initiators will generally receive a signal including at least the signals from the other signal initiators. In many instances, a signal initiator's own signal will be excluded from the signal that is received by the signal initiator, so as to avoid potential echo effects. In other instances the initiator's own signal might be included in the signal that is received by the initiator, and removed by echo cancellation techniques in the initiator's receiver. Such a technique would have specific applicability to voice communications. In the more general push to transmit cases including non-voice communications, the combining may involve a concatenation or interleaving of data streams or packets. The combined data is then separated according to the initiator at the receiving end. If the data comprises voice data, the audio combining step may be part of the decoding process on the combined data at the receiving end.

In at least some instances, the combining of the signals from the multiple signal initiators may be performed within the network infrastructure, such as within a corresponding server. In at least some instances, the network may make use of available three-party circuits and/or summing bridge circuits. In at least some other instances, the combining of the signals may be performed in at least one of the communication units, which are signal initiators. In at least some of these embodiments, the communication unit, which performs the signal combining is the communication unit, which continues to request on-demand communications, and has the highest priority or initiated their request for on-demand communications the earliest. In such an instance, the communication unit responsible for combining signals, may change if the highest priority communication unit discontinues their request for on-demand communications, in which case the responsibility may need to be transferred. In at least some embodiments, an on-demand communication continues to be requested for a duration corresponding to the time that an associated user actuated key remains actuated. In some instances, the highest priority communication unit could be tracked by maintaining a queue including a prioritized list of signal initiators.

Figure 2:
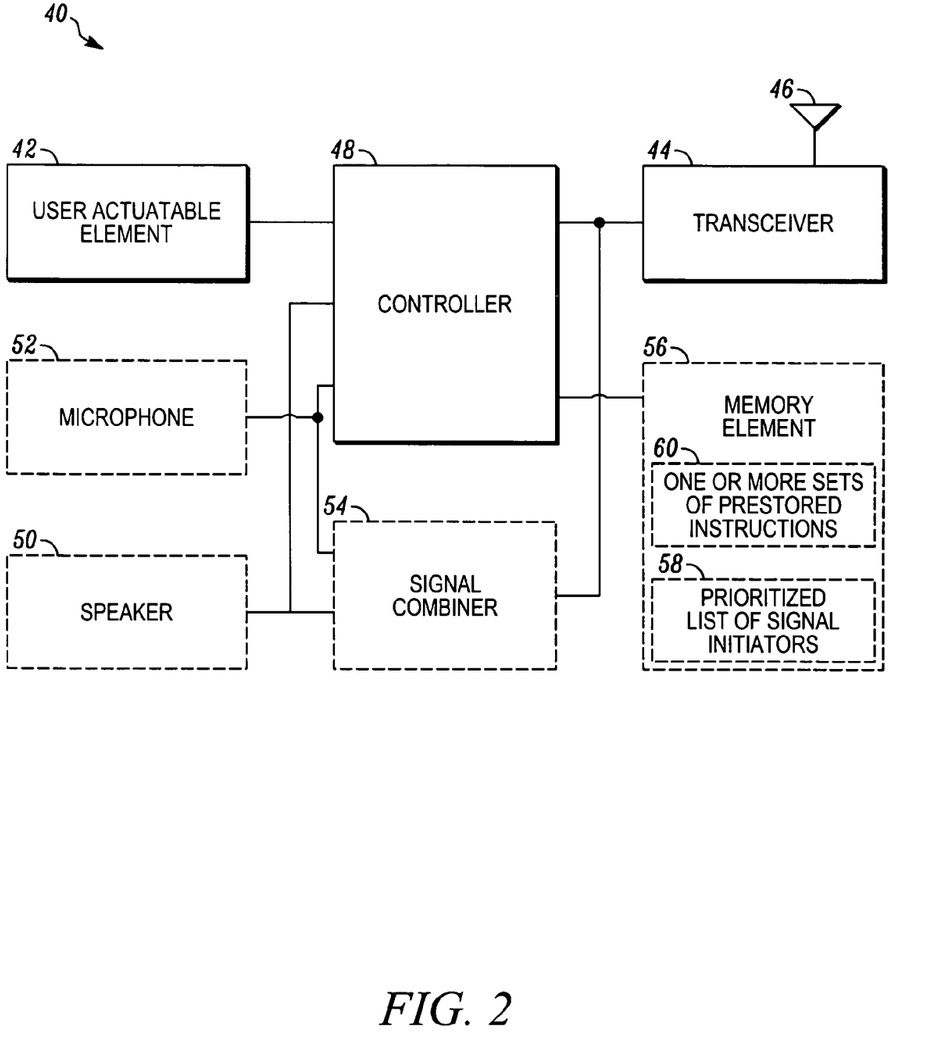
FIG. 2 is a block diagram of a signal initiator, in accordance with at least one embodiment of the present invention.

FIG. 2 illustrates a more detailed block diagram of a signal initiator 40, in accordance with at least one embodiment of the present invention. The signal initiator 40 includes a user actuatable element 42 for use in initiating an on-demand communication. In at least some instances, the user actuatable element 42 will need to be maintained in an actuated state for the duration of the on-demand communication.

The signal initiator 40 additionally includes a transceiver 44 for sending and receiving a communication signal including one or more signals from one or more signal initiators. In at least some embodiments, the sending and receiving occurs wirelessly, which is facilitated by an antenna 46 that is coupled to the transceiver 44.

Still further the signal initiator 40 includes a controller 48, which is adapted for conveying a signal intended for one or more communication units forming a communication group, when the user actuatable element associated with on-demand communication is initiated. The controller is further adapted for receiving a signal including at least the combination of any signals conveyed by other signal initiators in the group. In at least some instances the received signal including at least the combination of any signals conveyed by the other signal initiator in the group is relayed to the user in the form of an audible signal via a speaker 50. Conversely, a signal intended for one or more communication units forming a communication group, which is conveyed, can include audio signals detected by a microphone 52.

In some embodiments, the signal initiator 40 can additionally include a signal combiner 54 and a memory element 56 including a prioritized list of signal initiators 58 to facilitate, where desired the combining of signals within one of the signal initiators. Still further the controller 48 could be incorporated using one or more microprocessors, which execute routines written in executable code, as well as other circuitry for managing the control of the operation of the signal initiator 40. In some instances any executable code could be in the form of one or more sets of prestored instructions 60 and could be stored in a memory element 56, which may be coupled to the controller 48 and included as part of the signal initiator 40. Alternatively, any prestored instructions could be included as part of the controller 48. The prestored instructions could take the form of firmware, microcode, and/or a file containing a list of executable instructions.

Figure 3:
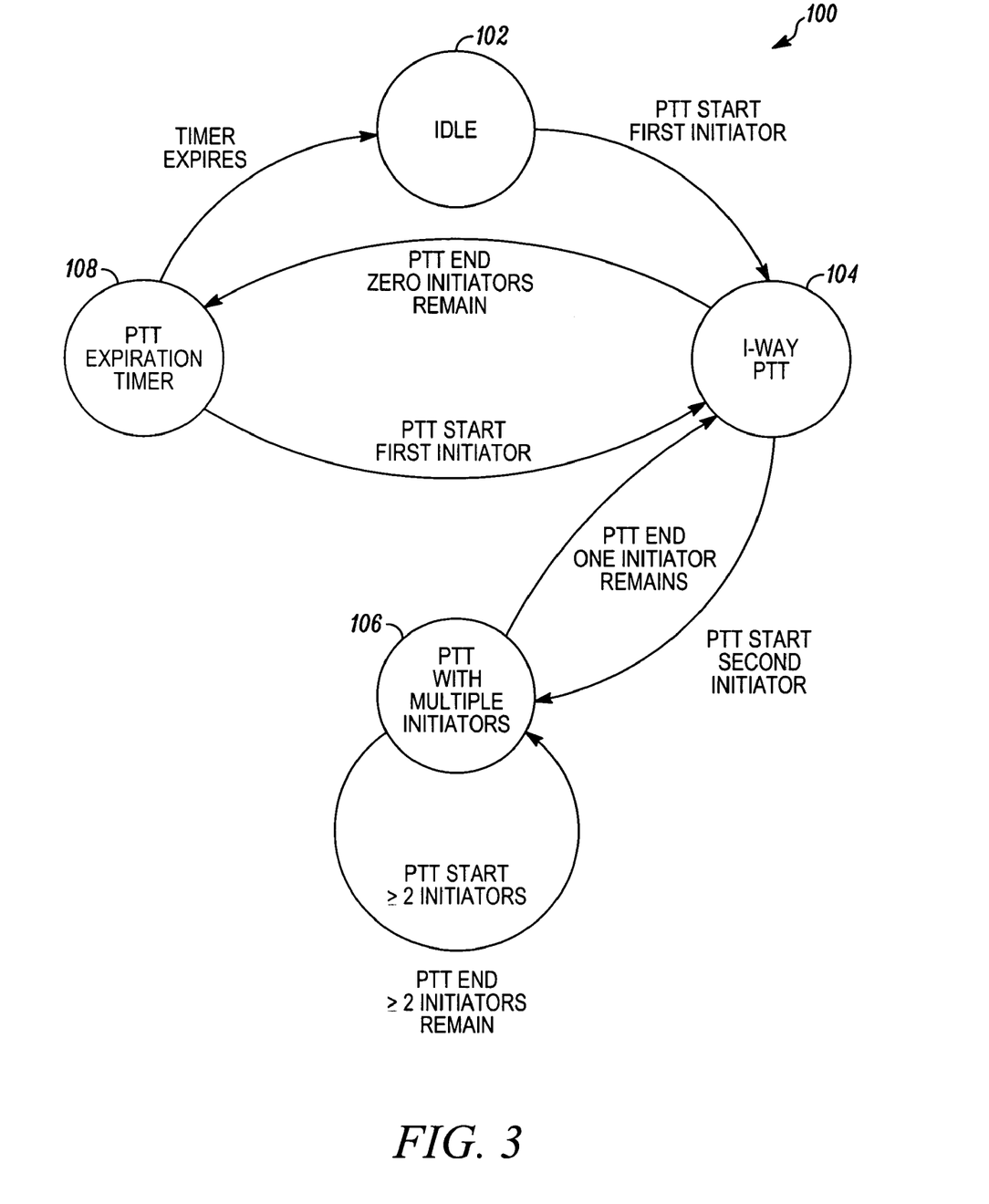
FIG. 3 is a state diagram illustrating the state of an on-demand communication connection adapted for supporting multiple signal initiators.

FIG. 3 illustrates a state diagram 100 illustrating the state of an on-demand communication, and more specifically to an exemplary push to talk connection adapted for supporting multiple signal initiators. In the illustrated embodiment, the state diagram 100 includes a state machine having four defined states. The specific example relative to FIG. 3 illustrates the state of the on-demand communication connection as one or more signal initiators selectively initiate an on-demand communication as part of a common communication.

In the illustrated example, the state machine includes an idle state 102, a one-way push to talk state 104 (i.e. a push to talk state with a single initiator), a push to talk state with multiple initiators 106, and a push to talk (PTT) expiration timer state 108. Generally, the state machine will remain in an idle state 102 until a PTT communication is started (i.e. initiated) with at least a first signal initiator. Upon starting a PTT communication, the state machine will transition from an idle state 102 to a one-way PTT state 104. The state machine will remain in the one way PTT state 104 until either the first signal initiator discontinues the PTT communication or a second signal initiator initiates a PTT communication, while the PTT communication initiated by the first signal initiator continues.

If the first signal initiator discontinues the PTT communication, the state machine activates a PTT expiration timer 108. However, if second signal initiator initiates a PTT communication, while the PTT communication initiated by the first signal initiator continues, the state machine transitions to a PTT state with multiple initiators 106.

The push to talk timer state 108, starts a timer, which is directed to maintaining the supporting communication connections for a period of time before the communication resources are released. In this way, if a subsequent member of the group wants to initiate a further communication before the expiration of the timer, then the communication may take advantage of communication resources, which may already be largely established. In at least one embodiment, the push to talk timer has a value of approximately ten seconds. If the timer expires before a subsequent PTT communication is initiated, then the communication resources are released and the state machine returns to an idle state 102. If the timer fails to expire before a subsequent PTT communication is initiated, then the state machine returns to the one-way push to talk state 104.

If while the state machine is in a PTT state with multiple initiators 106, regardless as to whether additional signal initiators initiate or discontinue PTT communications, so long as the number of signal initiators continuing a PTT communication is equal to or greater than two, the state machine will remain in the PTT state with multiple initiators 106. If the number of signal initiators continuing a PTT communication should fall below two, then the state machine will transition back to a one-way PTT state 104.

It is noted, that the state machine can be implemented in software or hardware. More specifically, the state machine could be formed using hardware elements, such as logic gates and/or elements. Alternatively, the state machine could be implemented using prestored program instructions, and/or could be implemented using a combination of both hardware elements and programming instructions.

Figure 4:
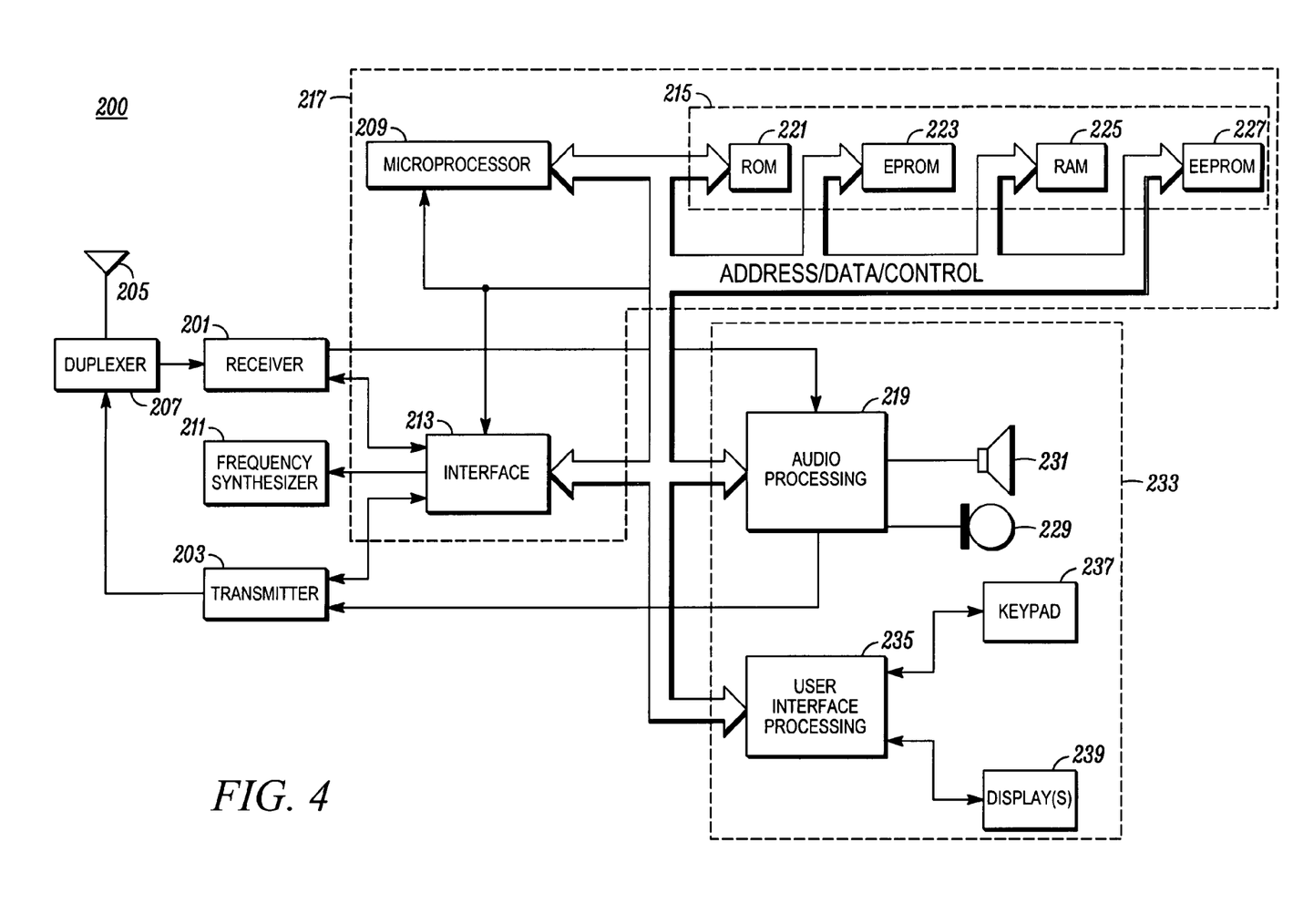
FIG. 4 is a block diagram of least one embodiment of the wireless communication device, which could be used to incorporate the present invention.

FIG. 4 illustrates an exemplary block diagram for at least one embodiment of a wireless communication device 200, which could be used to implement the present invention. The wireless communication device 200 includes a radio receiver 201 and a transmitter 203. Both the receiver 201 and the transmitter 203 are coupled to an antenna 205 of the wireless communication device by way of a duplexer 207. The particular radio frequency to be used by the transmitter 203 and the receiver 201 is determined by the microprocessor 209 and conveyed to the frequency synthesizer 211 via the interface circuitry 213. Data signals received by the receiver 201 are decoded and coupled to the microprocessor 209 by the interface circuitry 213, and data signals to be transmitted by the transmitter 203 are generated by the microprocessor 209 and formatted by the interface circuitry 213 before being transmitted by the transmitter 203. Operational status of the transmitter 203 and the receiver 201 is enabled or disabled by the interface circuitry 213.

In at least one embodiment, the microprocessor 209 forms part of the processing unit, which in conjunction with the interface circuitry 213 performs the necessary processing functions under the control of program instructions stored in a memory section 215. Together, the microprocessor 209 and the interface circuitry 213 can include one or more microprocessors, one or more of which may include a digital signal processor (DSP). The memory section 215 includes one or more forms of volatile and/or non-volatile memory including conventional ROM 221, EPROM 223, RAM 225, or EEPROM 227. Identifying features of the wireless communication device are typically stored in EEPROM 227 (which may also be stored in the microprocessor in an on-board EEPROM, if available) and can include the number assignment (NAM) required for operation in a conventional cellular system.

To the extent that the communication controller including the state machine 100 is implemented in hardware, the logic elements could be located in interface 213 and/or user interface processing 235, and/or make use of memory elements in memory section 215. To the extent that the communication controller is implemented using programming instructions, the programming instruction could be stored in memory section 215 for execution by one or more processors including microprocessor 209.

Control of user audio, the microphone 229 and the speaker 231, is controlled by audio processing circuitry 219, which forms part of a user interface circuit 233. The user interface circuit 233 additionally includes user interface processing circuitry 235, which manages the operation of any keypad(s) 237 and/or display(s) 239. It is further envisioned that the user actuatable element 42 for initiating an on-demand communication could be one of the keys or buttons included as part of the keypad 237.

Figure 5:
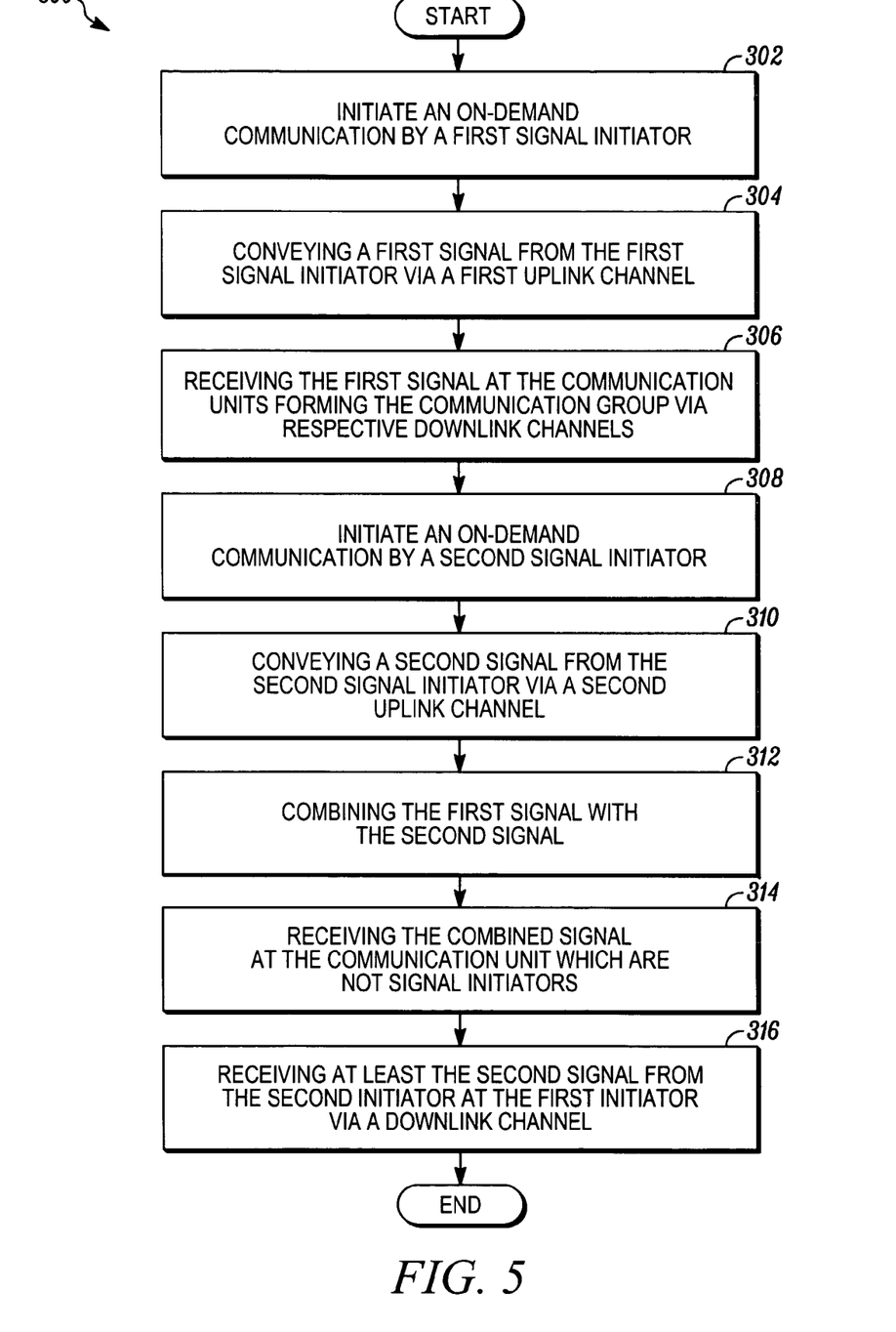
FIG. 5 is a flow diagram of a method for on-demand communications in a communication network with support for a plurality of communication units in a common communication, supporting the virtual simultaneous conveyance of signals from multiple signal initiators.

FIG. 5 illustrates a flow diagram 300 of a method for on-demand communications in a communication network with support for a plurality of communication units in a common communication, supporting the virtual simultaneous conveyance of signals from multiple signal initiators. The method 300 includes initiating 302 an on-demand communication by a first signal initiator for conveyance of a first signal to one or more communication units forming a communication group. The first signal intended for the one or more communication units forming a communication group is then conveyed 304 from the first signal initiator via a first uplink channel, and then received 306 at the one or more communication units forming the communication group via respective downlink channels.

An on-demand communication is then initiated 308 by a second signal initiator from the one or more communication units forming the communication group for conveyance of a second signal to the other communication units of the one or more communication units forming the communication group and the first signal initiator, while the on-demand communication initiated by the first signal initiator continues. The second signal intended for the other communication units of the one or more communication units forming a communication group and the first signal initiator is then conveyed 310 from the second signal initiator via a second uplink channel.

The first signal with the second signal are combined 312 forming a combined signal. The combined signal is then received 314 at any of the one or more communication units forming the communication group, which are not acting as signal initiators, via the respective downlink channels in place of the first signal from the first initiator. A signal including at least the second signal from the second signal initiator is then received 316 at the first signal initiator via a downlink channel.

Figure 6:
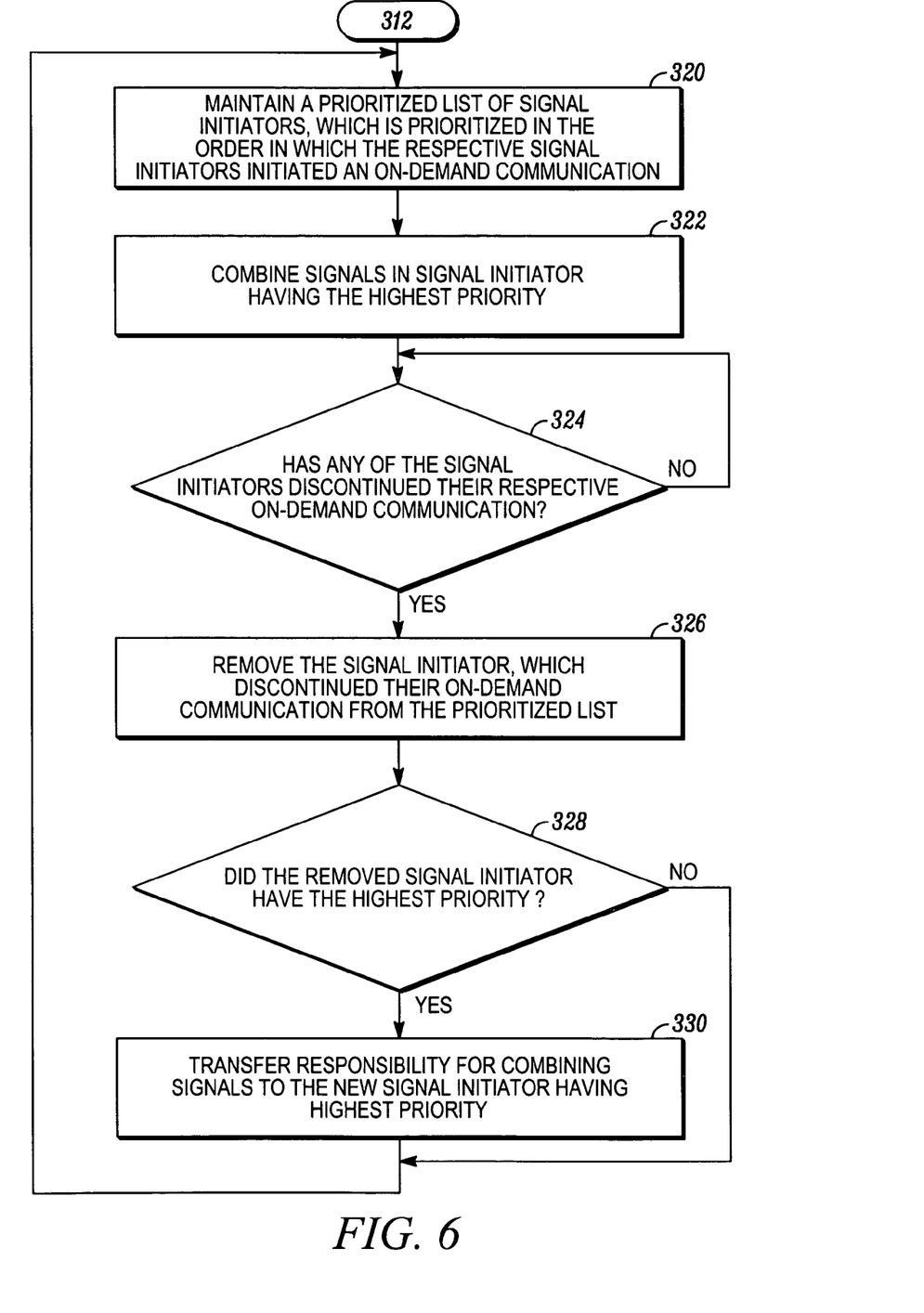
FIG. 6 is a more detailed flow diagram for combining signals from each of the signal initiators, in accordance with at least one embodiment.

FIG. 6 illustrates a more detailed flow diagram for combining 312 signals from each of the signal initiators, in accordance with at least one embodiment. In the more detailed flow diagram, a prioritized list of signal initiators is maintained 320, which is prioritized in the order in which the respective signal initiators initiated an on-demand communication. The signals are then combined 322 in the signal initiator having the highest priority. A determination 324 is then made as to whether any of the signal initiators have discontinued their respective on-demand communication. If yes, then the signal initiator, which discontinued their on-demand communication is removed 326 from the prioritized list. A determination 328 is then made as to whether the signal initiater having the highest priority was removed. If the signal initiater having the highest priority was removed, then responsibility for combining signals is transferred 330 to the new signal initiator having the highest priority.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for on-demand communications in a communication network with support for a plurality of communication units participating in a common communication, which includes multiple signal initiators, each supplying a signal, which together are virtually simultaneously conveyed as part of the common communication, said method comprising:
   initiating an on-demand communication by a first signal initiator for conveyance of a first signal to one or more communication units forming a communication group;
   conveying the first signal intended for the one or more communication units forming a communication group from the first signal initiator via a first uplink channel;
   receiving for processing the first signal from the first signal initiator at the one or more communication units forming the communication group via respective downlink channels;
   initiating an on-demand communication by a second signal initiator from the one or more communication units forming the communication group for conveyance of a second signal to the other communication units of the one or more communication units forming the communication group and the first signal initiator, while the on-demand communication initiated by the first signal initiator continues;
   conveying the second signal intended for the other communication units of the one or more communication units forming a communication group and the first signal initiator from the second signal initiator via a second uplink channel;
   combining the first signal with the second signal forming a combined signal;
   receiving for processing the combined signal at any of the one or more communication units forming the communication group, which are not acting as signal initiators, via the respective downlink channels in place of the first signal from the first initiator; and
   receiving for processing a signal including at least the second signal from the second signal initiator at the first signal initiator via a downlink channel; and
   wherein each of the first and second signal initiators processes a received signal, where the on-demand communication which originates from the signal initiator that is processing the received signal is not included as part of the processed received signal.

2. A method in accordance with claim 1, wherein the on-demand communication includes a push to talk communication.

3. A method in accordance with claim 1, wherein one or more of the respective downlink channels and the first and second uplink channels, which couple a communication unit to a communication network, are each packet data channels.

4. A method in accordance with claim 1, wherein one or more of the respective downlink channels and the first and second uplink channels, which couple a communication unit to a communication network, each comprises at least part of a corresponding circuit switched connection.

5. A method in accordance with claim 1, wherein initiating an on-demand communication includes actuating a button.

6. A method in accordance with claim 1, wherein continuing an on-demand communication includes maintaining an actuation of a button used to actuate an on-demand communication.

7. A method in accordance with claim 1, wherein forming a combined signal occurs in the first signal initiator.

8. A method in accordance with claim 1, wherein forming a combined signal occurs in a server, which is one of coupled to the communication network and forms part of the communication network.

9. A method in accordance with claim 1, wherein the common communication includes more than two signal initiators.

10. A method in accordance with claim 9, wherein each of the signal initiators receives a signal, which includes a combination of at least the signals produced by the other signal initiators.

11. A method in accordance with claim 9, further comprising maintaining a prioritized list of signal initiators, which is prioritized in the order in which the respective signal initiators initiated an on-demand communication, and wherein forming a combined signal occurs in the signal initiator having the highest priority in the list of signal initiators.

12. A method in accordance with claim 11, wherein a signal initiator is removed from the prioritized list of signal initiators, when the signal initiator discontinues the respective on-demand communication.

13. A method in accordance with claim 12, wherein when the signal initiator having the highest priority, discontinues the respective on-demand communication, the signal initiator having the next highest priority becomes a new signal initiator having the highest priority and the new signal initiator where the combined signal is formed.

14. A method in accordance with claim 1, wherein each of the uplink and the downlink channels are half-duplex communication channels.

15. A method in accordance with claim 1, further comprising terminating the common communication after all of the on-demand communications associated with the common communication are discontinued.

16. A method in accordance with claim 15, wherein the common communication is terminated after a predetermined period of time that a last one of signal initiators discontinues a corresponding on-demand communication, if before the expiration of the predetermined period of time a new on-demand communication associated with the common communication is not initiated.

17. A method in accordance with claim 15, wherein terminating the common communication includes releasing any associated communication resources including the first and second uplink channels and the respective downlink channels.

18. A signal initiator adapted for supporting on-demand communications in a communication network with support for a plurality of communication units participating in a common communication, which includes multiple signal initiators, each supplying a signal, which are virtually simultaneously conveyed as part of the common communication, said signal initiator comprising:
   a user actuatable element for initiating an on-demand communication;

a transceiver for sending and receiving a communication signal including one or more signals from one or more signal initiators;

a controller, which is adapted for conveying a signal intended for one or more communication units forming a communication group, when the user actuatable element associated with on-demand communication is initiated, and adapted for receiving a signal including at least the combination of any signals conveyed by other signal initiators in the group.

19. A signal initiator in accordance with claim 18, further comprising:

a signal combiner for selectively producing a corresponding combined signal for each communication unit in the group, which selectively combines the signals produced by the signal initiators in the group.

20. A signal initiator in accordance with claim 18, wherein the signal initiator is a radio telephone.

21. A signal initiator in accordance with claim 18, wherein the controller is adapted for receiving a signal including at least the combination of any signals conveyed by other signal initiators in the group, while the signal initiator is supplying a signal as part of a common on-demand communication.

22. A communication network comprising:

a plurality of communication units participating in a common communication, the plurality of communication units including at least a first communication unit and a second communication unit operating as a signal initiator, where at least the first communication unit and the second communication unit, each send a signal which together are virtually simultaneously conveyed as part of the common communication;

each of the at least first communication unit and the second communication unit comprises:

a user actuatable element for initiating an on-demand communication;

a transceiver for sending and receiving a communication signal including one or more signals from the at least first communication unit and second communication unit operating as a signal initiator; and a controller, which is adapted for conveying a signal intended for the other communication units participating in the common communication, when the user actuatable element associated with on-demand communication is initiated, and adapted for receiving a signal including at least the combination of any signals conveyed by the other communication units participating in the common communication, which are operating as signal initiators.

23. A communication network in accordance with claim 22, wherein at least the first communication unit further comprises a signal combiner for selectively producing a corresponding combined signal for each of the communication units in the plurality of communication units, which selectively combines the signals produced by the communication units operating as signal initiators in the plurality of communication units, such that each of the plurality of communication units receives any signals conveyed by at least the other communication units participating in the common communication, which are operating as signal initiators.

24. A communication network in accordance with claim 22, further comprising a server including a signal combiner for selectively producing a corresponding combined signal for each of the communication units in the plurality of communication units, which selectively combines the signals produced by the communication units operating as signal initiators in the plurality of communication units, such that each of the plurality of communication units receives any signals conveyed by at least the other communication units participating in the common communication, which are operating as signal initiators.

\* \* \* \* \*